(12) United States Patent
Wang et al.

(10) Patent No.: US 10,688,653 B2
(45) Date of Patent: Jun. 23, 2020

(54) WEARABLE INTELLIGENT EXOSKELETON SEAT APPARATUS

(71) Applicant: GUANGDONG SYGOLE INTELLIGENT TECHNOLOGY CO., LTD., Dongguan (CN)

(72) Inventors: Donghai Wang, Dongguan (CN); Kok-Meng Lee, Atlanta, GA (US)

( * ) Notice: Subject to any disclaimer, the term of this patent is extended or adjusted under 35 U.S.C. 154(b) by 54 days.

(21) Appl. No.: 16/246,546

(22) Filed: Jan. 14, 2019

(65) Prior Publication Data

US 2020/0061803 A1    Feb. 27, 2020

(51) Int. Cl.
*B25J 9/00* (2006.01)
*B25J 9/12* (2006.01)
*A61H 3/00* (2006.01)

(52) U.S. Cl.
CPC ............ *B25J 9/0006* (2013.01); *B25J 9/126* (2013.01); *A61H 2003/007* (2013.01); *A61H 2201/1215* (2013.01); *A61H 2201/165* (2013.01); *A61H 2201/503* (2013.01); *A61H 2203/0418* (2013.01); *A61H 2205/102* (2013.01); *A61H 2230/625* (2013.01)

(58) Field of Classification Search
CPC ....... B25J 9/00; B25J 9/006; A61H 2205/105; A61H 2203/0418; A61H 2201/0149; A61F 2/60; A61F 2/64; A61F 2002/6854; A61F 2002/6845

See application file for complete search history.

(56) References Cited

U.S. PATENT DOCUMENTS

| | | | |
|---|---|---|---|
| 4,090,264 A * | 5/1978 | Thompson | A61F 2/604 623/41 |
| 9,719,633 B2 | 8/2017 | Sacksteder et al. | |
| 10,195,736 B2 * | 2/2019 | Barnes | B25J 9/0006 |
| 2007/0123997 A1 | 5/2007 | Herr et al. | |
| 2007/0270976 A1 * | 11/2007 | DeHarde | A61F 5/0127 623/27 |
| 2018/0036146 A1 | 2/2018 | Zhang et al. | |
| 2018/0184727 A1 | 7/2018 | Petruschka et al. | |
| 2019/0125551 A1 * | 5/2019 | Hummelshoj | A61F 2/50 |
| 2019/0283236 A1 * | 9/2019 | Nam | A61H 1/0244 |
| 2020/0085667 A1 * | 3/2020 | Chen | A61H 1/0262 |

* cited by examiner

*Primary Examiner* — Bruce E Snow
(74) *Attorney, Agent, or Firm* — Erson IP (Nelson IP)

(57) ABSTRACT

A wearable intelligent exoskeleton seat apparatus includes a thigh mechanism, a knee joint mechanism and a shank mechanism, the knee joint mechanism is fixedly coupled to the shank mechanism and the thigh mechanism respectively; the knee joint mechanism includes a knee joint support rod, a motor frame, a motor, a movable base, a flexible spring piece, ratchet teeth, a ratchet tooth shaft, a ratchet wheel, a ratchet wheel shaft and a shank connecting base; the knee joint support rod is fixedly connected with the thigh mechanism; the motor is mounted on the upper end of the knee joint support rod through the motor frame; the ratchet teeth is rotatably mounted to the knee joint support rod via the ratchet tooth shaft; the ratchet wheel is rotabaly mounted to the knee joint support rod via the ratchet wheel shaft; the ratchet teeth and the ratchet wheel are mounted directly opposite to each other.

8 Claims, 6 Drawing Sheets

WEARABLE INTELLIGENT EXOSKELETON SEAT APPARATUS

CROSS-REFERENCE TO RELATED APPLICATIONS

This application claims priority to Chinese Patent Application No. 201810983231.7 with a filing date of Aug. 27, 2018. The content of the aforementioned applications, including any intervening amendments thereto, are incorporated herein by reference.

TECHNICAL FIELD

The present disclosure belongs to the fields of medical auxiliary equipment and sports aid equipment, in particular to a wearable intelligent exoskeleton seat apparatus.

BACKGROUND OF THE PRESENT INVENTION

Due to restraints in working environments and working characteristics, there are still many types of jobs that require employees to spend a long time on standing, such as surgeons and workers on industrial production lines. However, spending a long time on standing for productive labor is likely to cause the soreness in muscles of the lower limbs and the back, and even varicose veins of the lower limbs, resulting in a decrease in production efficiency and occupational diseases. Spending a long time on standing for the surgeons is prone to the fatigue of the back, the soreness in the joints of the lower limbs, the distraction during the surgery, and the increase in the surgical risk. Spending a long time on standing for the workers on the industrial production lines are prone to the fatigue and occupational diseases, which not only causes the decrease in the quality of produced products, but also easily increases the economic burden of employees and enterprises due to the occupational diseases. On the other hand, the surgeons need to walk around occasionally to adjust operation positions and postures. The workers on the industrial production lines also need to move continuously to take tools and transport production materials. Therefore, traditional seats cannot walk with the human body, and a wearer cannot sit down in any posture anytime and anywhere.

In order to solve problems of the load and fatigue of joints and muscles when standing and half-squatting to bear the load during frequent movement, various "wearable seats" have appeared, and a human body may sit down anywhere after wearing them. An existing "wearable seat" has two shortcomings: on the one hand, most of the existing solutions adopt a solution of "a thigh rod, a shank rod and a knee joint damper", but the damper has a resistance, and the human body needs to overcome the resistance of the damper when wearing it to take every step, which limits the free flexion of the knee joint and is not convenient for free walking after the human body wears it. On the other hand, these "wearable seats" need to be manually pre-adjusted to a joint angle during sitting, but the surgeons need a hand-cleaning environment, and may not adjust a seat angle during sitting by the hand.

SUMMARY OF PRESENT INVENTION

A technical problem to be solved by the present disclosure is to provide a wearable intelligent exoskeleton seat apparatus, which is beneficial for reducing the load and fatigue of joints and muscles of lower limbs, and allows sitting at any angle anytime and anywhere.

In order to solve the above technical problem, the present disclosure adopts the following technical solution:

A wearable intelligent exoskeleton seat apparatus includes a thigh mechanism, a knee joint mechanism and a shank mechanism, wherein the knee joint mechanism is fixedly coupled to the shank mechanism and the thigh mechanism respectively; the knee joint mechanism includes a knee joint support rod, a motor frame, a motor, a movable base, a flexible spring piece, ratchet teeth, a ratchet tooth shaft, a ratchet wheel, a ratchet wheel shaft and a shank connecting base; the knee joint support rod is fixedly connected with the thigh mechanism; the motor is mounted on the upper end of the knee joint support rod through the motor frame; the ratchet teeth is rotatably mounted to the knee joint support rod via the ratchet tooth shaft; the ratchet wheel is rotabaly mounted to the knee joint support rod via the ratchet wheel shaft; the ratchet teeth and the ratchet wheel are mounted directly opposite to each other, the movable base is sleeved on a drive shaft of the motor, one end of the flexible spring piece is fixedly connected with the movable base and the other end thereof is fixedly connected with the ratchet teeth; the ratchet wheel and the shank connecting base are fixedly locked by a bolt; and the shank connecting base is fixedly connected with the shank mechanism.

A limit switch for limiting a position to which the movable base resets along the drive shaft of the motor is disposed on the motor frame. A protective cover plate is further disposed on the shank connecting base.

The thigh mechanism includes a thigh rod, a thigh fixing ring and a strap, wherein the strap is coupled to the thigh fixing ring, the thigh fixing ring is fixedly mounted on the thigh rod, a circuit control module is disposed within the thigh rod and provided with an inertia measurement unit for detecting a standing posture or a squatting posture of the thigh, and a switch connected with the circuit control module is disposed on the side wall of the thigh rod.

The side wall of the thigh rod is further provided with a charging interface, which is connected with the circuit control module.

The shank mechanism includes a shank rod, a shank fixing ring and a strap, wherein the strap is coupled to the shank fixing ring, the shank fixing ring is fixedly mounted on the shank rod, and the lower portion of the shank rod is provided with a foot strap.

A shank length adjusting rod is further disposed within the shank rod, an adjusting button is disposed within the shank length adjusting rod and embedded in the shank length adjusting rod by a spring, a through hole matched with the adjusting button is provided on the shank rod, after the shank length adjusting rod is inserted in the shank rod, the adjusting button is inserted into the through hole of the shank rod; and the foot strap is mounted on the shank length adjusting rod.

A non-slip mat is arranged at a bottom of the shank length adjusting rod.

The present disclosure is convenient to operate and flexible in use, is beneficial for reducing the load and fatigue of the joints and muscles of the lower limbs, and allows sitting at any angle anytime and anywhere.

DETAILED DESCRIPTION OF PREFERRED EMBODIMENTS

In order to further understand features, technical means, achieved specific purposes and functions of the present disclosure, the present disclosure will be further described in detail below with reference to accompanying drawings and specific embodiments.

Figure 1:
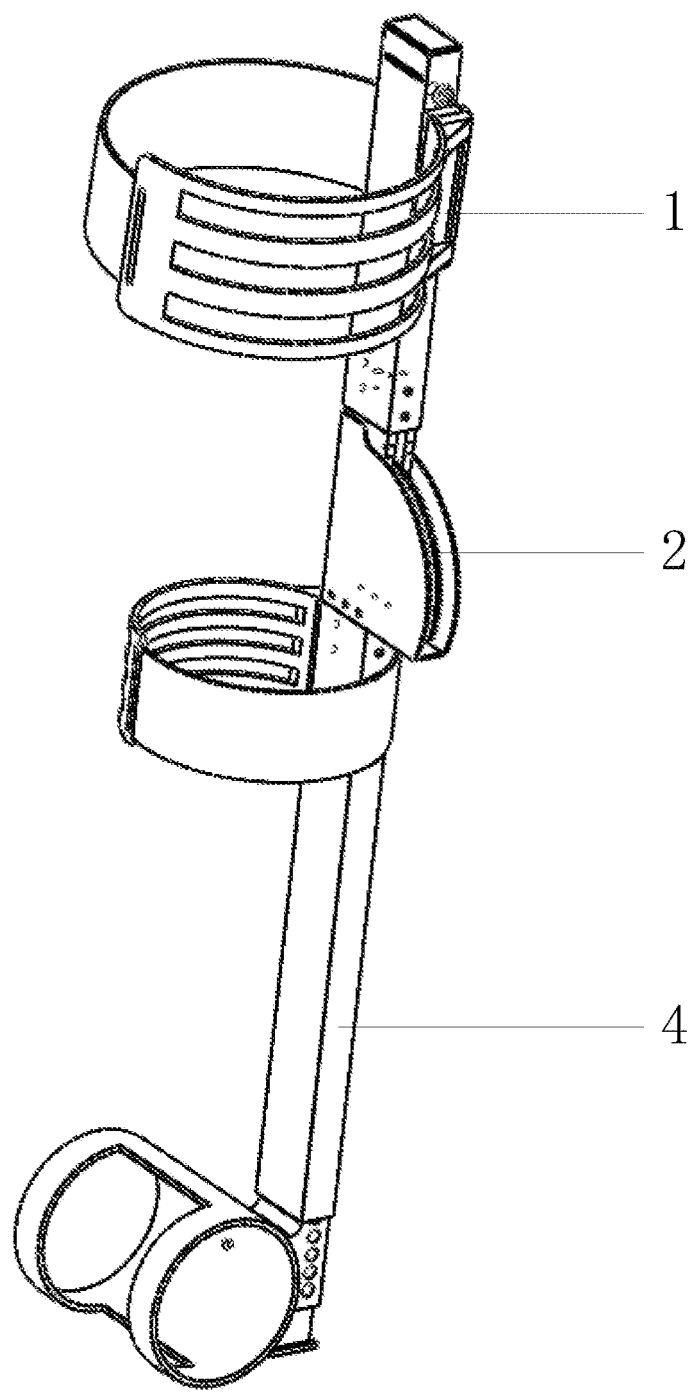
FIG. 1 is a schematic perspective view showing a structure of the present disclosure during standing.
Figure 2:
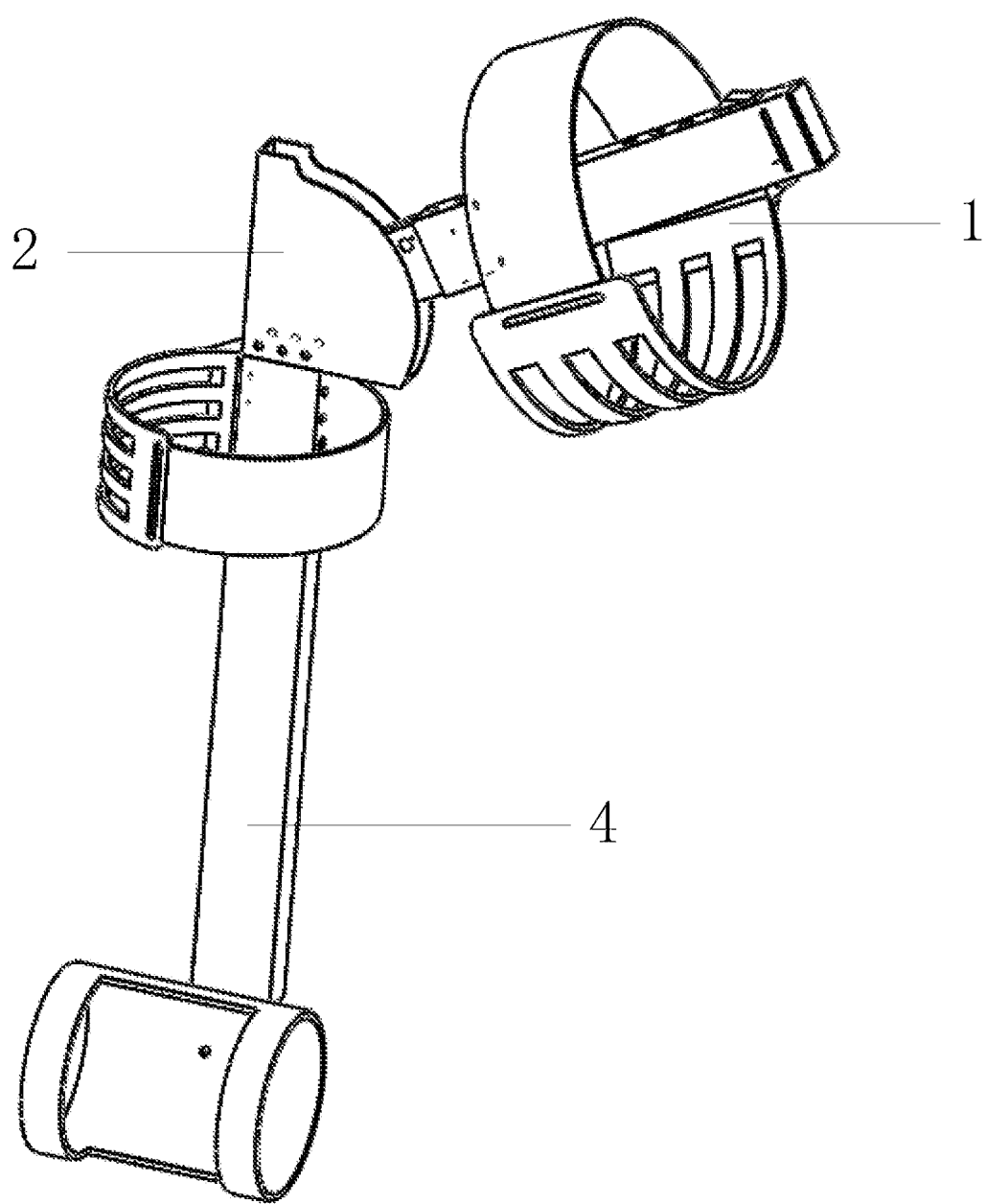
FIG. 2 is a schematic perspective view showing a structure of the present disclosure during sitting.

As shown in FIG. 1 and FIG. 2, the present disclosure discloses a wearable intelligent exoskeleton seat apparatus, including a thigh mechanism 1, a knee joint mechanism 2 and a shank mechanism 4, wherein the knee joint mechanism 2 is fixedly coupled to the shank mechanism 4 and the thigh mechanism respectively, and the knee joint mechanism drives the thigh mechanism to rotate relative to the shank mechanism to achieve a purpose of standing or sitting.

Figure 3:
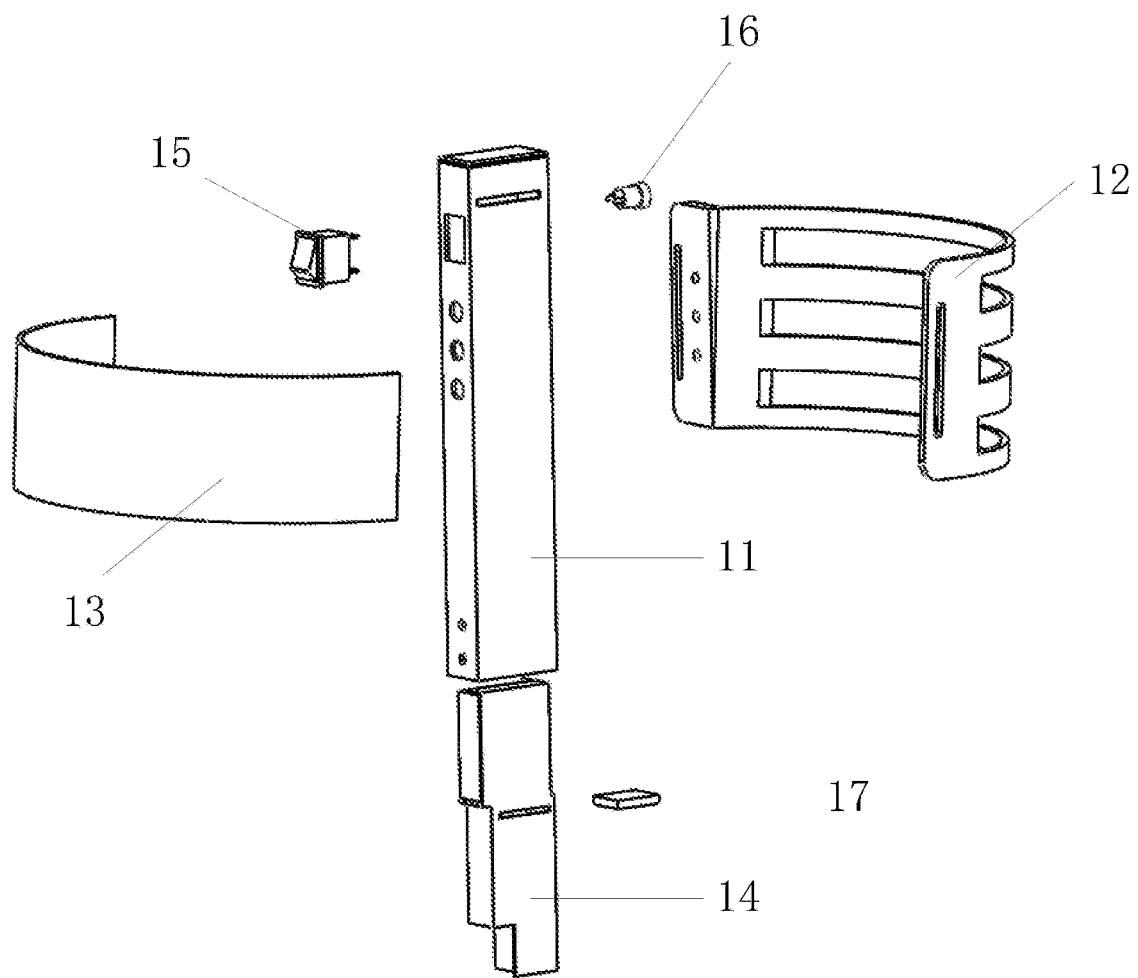
FIG. 3 is a schematic perspective view showing a structure of a thigh mechanism of the present disclosure.

As shown in FIG. 3, the thigh mechanism includes a thigh rod 11, a thigh fixing ring 12 and a strap 13, wherein a U-shaped ring is generally selected as the thigh fixing ring, the strap 13 is coupled to the thigh fixing ring 12, the thigh fixing ring 12 is fixedly mounted on the thigh rod 11, the thigh fixing ring 12 may adjust a mounting position relative to the thigh rod 11 to make different human bodies comfortable to wear, a circuit control module 14 is disposed within the thigh rod 11 and provided with an inertia measurement unit 17 for detecting a standing posture or a squatting posture of the thigh, the side wall of the thigh rod 11 is provided with a switch 15 connected with the circuit control module 14, the side wall of the thigh rod 11 is further provided with a charging interface 16, which is connected with the circuit control module 14, and the exoskeleton seat apparatus may be conveniently charged through the charging interface. After a user wears an exoskeleton seat, the power switch 15 is turned on, and the inertia measurement unit 17 of the thigh detects the standing posture or the squatting posture of the thigh.

Figure 4:
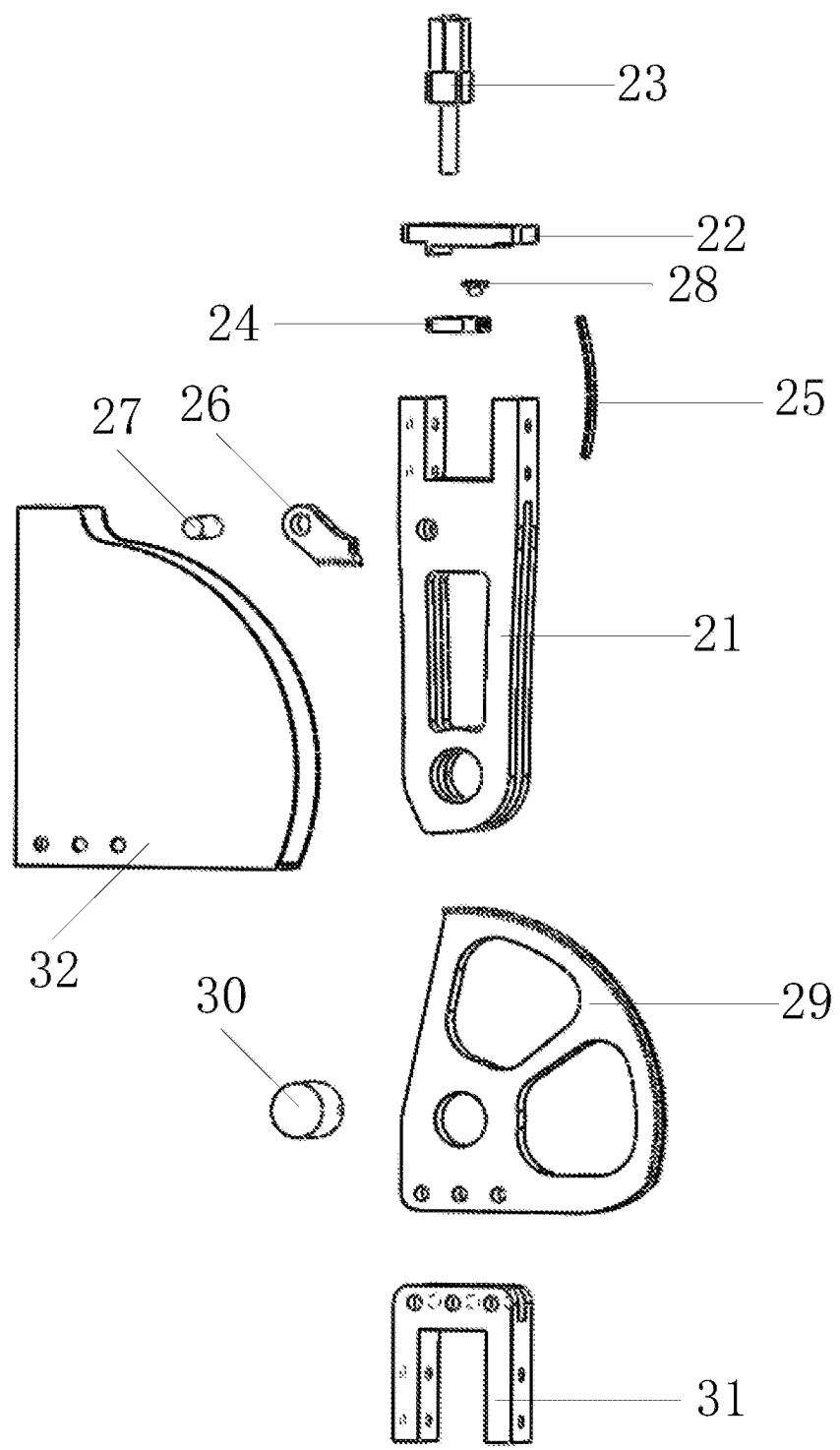
FIG. 4 is a schematic front perspective view showing a structure of a knee joint mechanism of the present disclosure.
Figure 5:
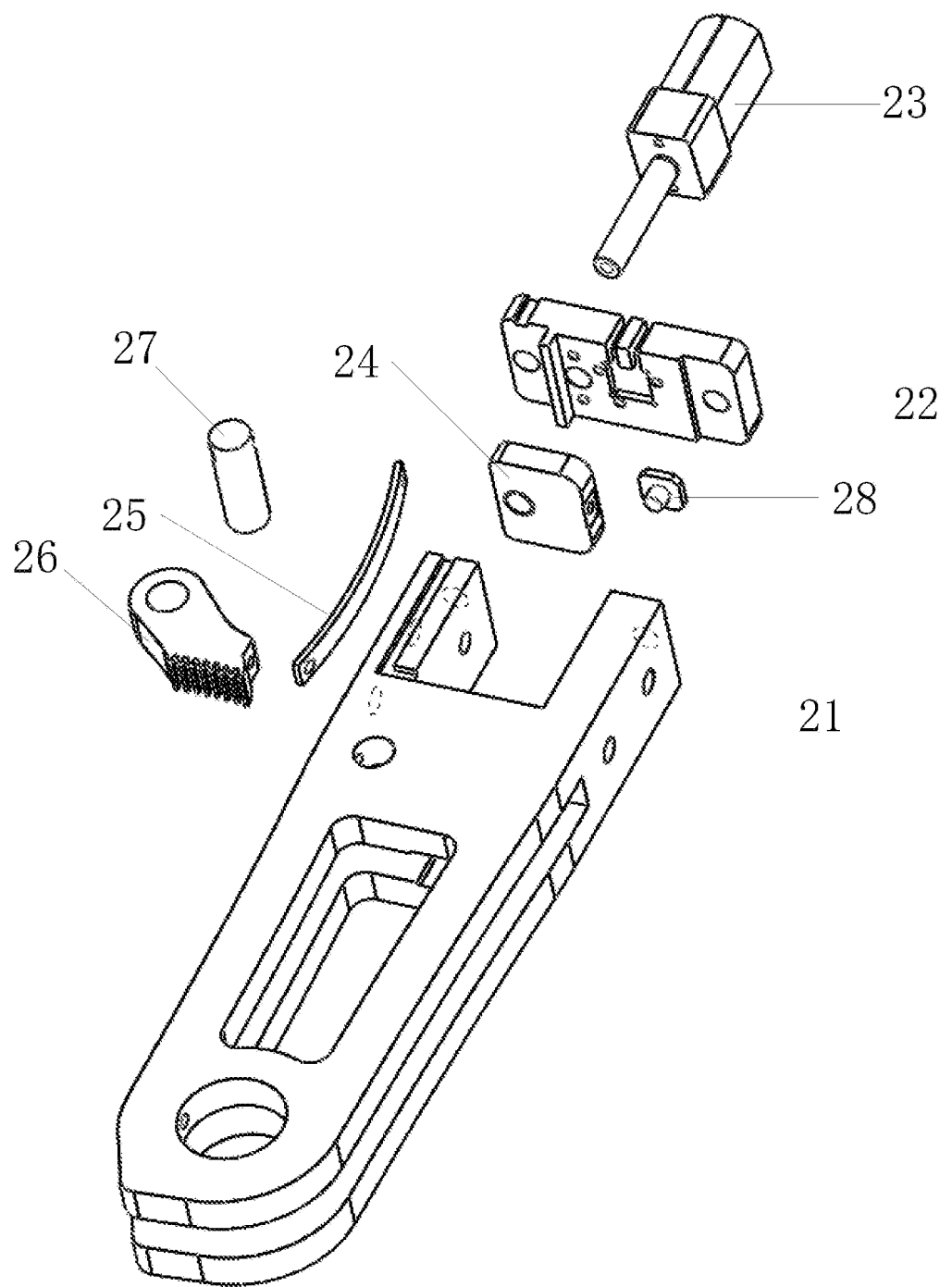
FIG. 5 is a schematic perspective view showing a ramp structure of a knee joint mechanism of the present disclosure.

As shown in FIG. 4 and FIG. 5, the knee joint mechanism includes a knee joint support rod 21, a motor frame 22, a motor 23, a movable base 24, a flexible spring piece 25, ratchet teeth 26, a ratchet tooth shaft 27, a ratchet wheel 29, a ratchet wheel shaft 30 and a shank connecting base 31, wherein the knee joint support rod 21 is fixedly connected with the thigh rod 11 in the thigh mechanism, the motor 23 is mounted on the upper end of the knee joint support rod 21 through the motor frame 22, the ratchet teeth 26 are rotatably connected with the knee joint support rod 21 through the ratchet tooth shaft 27, the ratchet wheel 29 and the knee joint support rod 21 are rotatably mounted by the ratchet wheel shaft 30, the ratchet teeth 26 and the ratchet wheel 29 are mounted directly opposite to each other, the movable base 24 is sleeved on a drive shaft of the motor 23; one end of the flexible spring piece 25 is fixedly connected with the movable base 24 and the other end thereof is fixedly connected with the ratchet teeth 26, the ratchet wheel 29 and the shank connecting base 31 are fixedly locked by a bolt, and the shank connecting base 31 is fixedly connected with the shank mechanism 4. A limit switch 28 is disposed on the motor frame 22, and controls a position of the movable base 24 as it resets along the motor shaft. A protective cover plate 32 is further mounted on the shank connecting base 31, and the protective cover plate 32 houses the ratchet wheel 29 therein. The drive shaft of the motor is of a threaded structure, a threaded hole is disposed on the movable base, and the movable base is connected with the drive shaft of the motor in a threaded manner. When the ratchet teeth are engaged with the ratchet wheel, the knee joint support rod is capable of only rotating in a direction in which the knee joint is straightened, not rotating in a direction in which the knee joint is bent. When the user needs to walk, it is necessary to utilize the motor to drive the movable base to move upwards, and the ratchet teeth are pulled upwards by the flexible spring piece, so that the ratchet teeth are no longer engaged with the ratchet wheel, so that a purpose that the knee joint support rod can be freely rotated without being restrained is achieved, and the walking is facilitated.

After wearing the exoskeleton seat, a human body stands up straight and a power supply is started, the motor reversely rotates, and pulls the movable base upwards, the moveable seat upward pulls the flexible spring piece, and the flexible spring piece pulls the ratchet teeth upwards, so that the motor reset ends until the movable base triggers the limit switch, at this time, the ratchet teeth and the ratchet wheel are disengaged, the knee joint may be freely rotated, and the human body may walk without resistance when wearing it. After the human body squats, the inertia measurement unit of the thigh detects a tilting posture of the thigh, the motor normally rotates, and pushes the movable base downwards, the movable base pushes the flexible spring piece downwards, and the flexible spring piece pushes the ratchet teeth downwards for a certain time, at this time, the ratchet teeth and the ratchet are engaged and locked, the knee joint is locked, the ratchet wheel may not continue to bend and rotate relative to the knee joint support rod, and the human body may sit on the exoskeleton seat with confidence. When the human body wants to adjust the sitting posture or walks freely, the human body naturally stands up by utilizing a principle that the ratchet wheel and the ratchet teeth may move in opposite directions, the inertia measurement unit of the thigh detects the standing posture of the thigh, and the motor repeats a reset process and the human body may readjust the sitting posture or walk freely.

Figure 6:
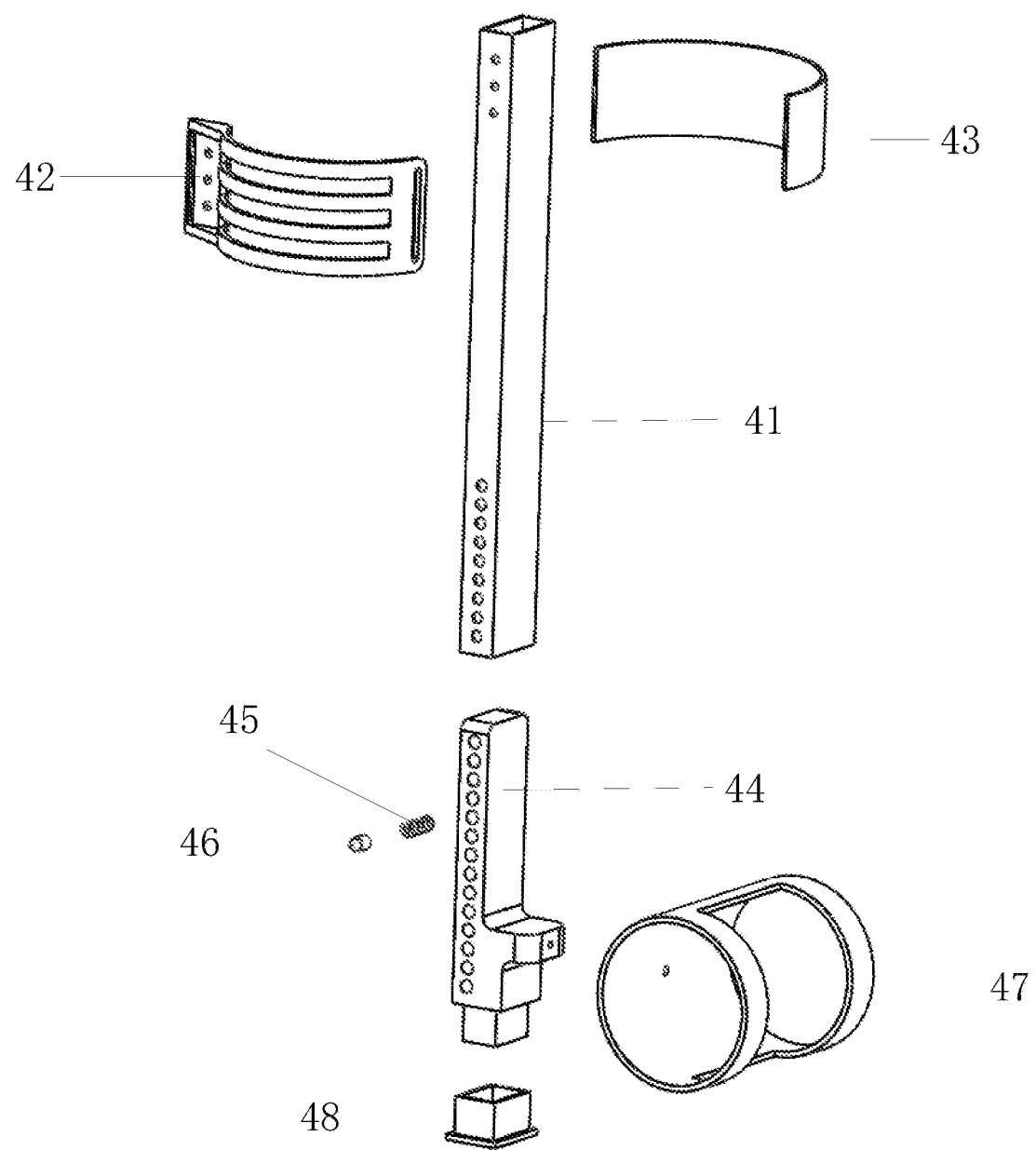
FIG. 6 is a schematic perspective view showing a structure of a shank mechanism of the present disclosure.

As shown in FIG. 6, the shank mechanism 4 includes a shank rod 41, a shank fixing ring 42 and a strap 43, wherein a U-shaped ring is selected as the shank fixing ring, the strap 43 is coupled to the shank fixing ring 42, the shank fixing ring 42 is fixedly mounted on the shank rod 41, and the shank fixing ring 42 may adjust a mounting position with respect to the shank rod 41 to make different human bodies comfortable to wear, and the lower portion of the shank rod is provided with a foot strap 47.

Further, a shank length adjusting rod 44 is further disposed within the shank rod 41, an adjusting button 46 is disposed within the shank length adjusting rod 44, the adjusting button 46 is embedded in the shank length adjusting rod 44 by a spring 45, a through hole matched with the adjusting button 46 is provided on the shank rod 41; after the shank length adjusting rod 44 is inserted into the shank rod 41, the adjusting button 46 is inserted into the through hole of the shank rod; and the foot strap 47 is mounted on the shank length adjusting rod 44. The bottom of the shank length adjusting rod 44 is provided with a non-slip mat 48.

By the adjusting button, the exoskeleton seat may be adjusted according to the length of the wearer's shank. The foot strap 47 and the shank length adjusting rod 44 are movably connected and relatively rotatable, and the foot strap 47 is sleeved on the wearer's shoe and bound by a front-end nylon fastener and a rear-end nylon fastener, the non-slip mat 48 and the lower end of the shank length adjusting rod 44 are fastened and connected and play roles of slip resistance and shock absorption when being in contact with ground.

In addition, when the solution is used, the wearable intelligent exoskeleton seat apparatuses for the left leg and the right leg are fixedly matched for use. The above description only describes a form of one leg mechanism, and structures of the two are the same, so that details will be omitted here.

It should be noted that the above is only a preferred embodiment of the present disclosure, and is not intended as limiting the present disclosure. Although the present disclosure has been described in detail with reference to the embodiment, those skilled in the art can still modify the technical solution described in the above embodiment or equivalently substitute some of technical features, but any modifications, equivalent substitutions, improvements, and the like, which are made within the spirit and principles of the present disclosure, should be included in a protective scope of the present disclosure.

We claim:

1. A wearable intelligent exoskeleton seat apparatus comprising a thigh mechanism, a knee joint mechanism and a shank mechanism, wherein the knee joint mechanism is fixedly coupled to the shank mechanism and the thigh mechanism respectively; the knee joint mechanism comprises a knee joint support rod, a motor frame, a motor, a movable base, a flexible spring piece, ratchet teeth, a ratchet tooth shaft, a ratchet wheel, a ratchet wheel shaft and a shank connecting base; the knee joint support rod is fixedly connected with the thigh mechanism; the motor is mounted on an upper end of the knee joint support rod through the motor frame; the ratchet teeth is rotatably mounted to the knee joint support rod via the ratchet tooth shaft; the ratchet wheel is rotabaly mounted to the knee joint support rod via the ratchet wheel shaft; the ratchet teeth and the ratchet wheel are mounted directly opposite to each other; the movable base is sleeved on a drive shaft of the motor; one end of the flexible spring piece is fixedly connected with the movable base and the other end thereof is fixedly connected with the ratchet teeth; the ratchet wheel and the shank connecting base are fixedly locked by a bolt; and the shank connecting base is fixedly connected with the shank mechanism.

2. The wearable intelligent exoskeleton seat apparatus according to claim 1, wherein a limit switch for limiting a position to which the movable base resets along the drive shaft of the motor is disposed on the motor frame.

3. The wearable intelligent exoskeleton seat apparatus according to claim 1, wherein a protective cover plate is further disposed on the shank connecting base.

4. The wearable intelligent exoskeleton seat apparatus according to claim 3, wherein the thigh mechanism comprises a thigh rod, a thigh fixing ring and a first strap, the strap is coupled to the thigh fixing ring, the thigh fixing ring is fixedly mounted on the thigh rod, a circuit control module is disposed within the thigh rod and provided with an inertia measurement unit for detecting a standing posture or a squatting posture of the thigh, and a switch connected with the circuit control module is disposed on a side wall of the thigh rod.

5. The wearable intelligent exoskeleton seat apparatus according to claim 4, wherein the side wall of the thigh rod is further provided with a charging interface connected with the circuit control module.

6. The wearable intelligent exoskeleton seat apparatus according to claim 5, wherein the shank mechanism comprises a shank rod, a shank fixing ring and a second strap, the strap is coupled to the shank fixing ring, the shank fixing ring is fixedly mounted on the shank rod, and a lower portion of the shank rod is provided with a foot strap.

7. The wearable intelligent exoskeleton seat apparatus according to claim 6, wherein a shank length adjusting rod is further disposed within the shank rod, an adjusting button is disposed within the shank length adjusting rod and embedded in the shank length adjusting rod by a spring, a through hole matched with the adjusting button is provided on the shank rod; after the shank length adjusting rod is inserted in the shank rod, the adjusting button is inserted into the through hole of the shank rod; and the foot strap is mounted on the shank length adjusting rod.

8. The wearable intelligent exoskeleton seat apparatus according to claim 7, wherein a non-slip mat is arranged at a bottom of the shank length adjusting rod.

* * * * *